United States Patent [19]

Augier

[11] Patent Number: 5,218,521

[45] Date of Patent: Jun. 8, 1993

[54] METHOD AND DEVICE FOR PROTECTING AN ELECTRICAL CONVERTER CIRCUIT AGAINST OVERLOAD

[75] Inventor: Jean-Louis Augier, Falicon, France

[73] Assignee: Telemecanique, France

[21] Appl. No.: 851,453

[22] Filed: Mar. 13, 1992

[30] Foreign Application Priority Data

Mar. 14, 1991 [FR] France .................. 91 03087

[51] Int. Cl.$^5$ .............................. H02H 7/10
[52] U.S. Cl. ........................ 363/56; 363/21; 361/18
[58] Field of Search .......... 363/16, 20, 21, 24, 363/25, 26, 56, 131; 361/18, 90, 91, 111

[56] References Cited

U.S. PATENT DOCUMENTS 4,326,245  4/1982  Saleh ..................... 363/21 X

Primary Examiner—Emanuel T. Voeltz
Attorney, Agent, or Firm—William A. Drucker

[57] ABSTRACT

A converter circuit supplied with a pulsed current by a primary source is protected against overload by producing a first voltage representing the product of the mean pulsed current and a first duty factor and a second voltage representing the product of the maximum wanted power and a second duty factor. The first and second voltages are compared and the output power of the converter is limited if the first voltage becomes greater than the second. The invention finds a particular application in regulated voltage power supplies which must be kept within acceptable operating limits.

13 Claims, 4 Drawing Sheets

METHOD AND DEVICE FOR PROTECTING AN ELECTRICAL CONVERTER CIRCUIT AGAINST OVERLOAD

BACKGROUND OF THE INVENTION

1. Field of the Invention

The present invention concerns a method and a device for protecting against overloads an electrical converter circuit fed with a pulsed current from a primary source.

It applies in particular, but not exclusively, to converter circuits such as voltage regulated power supplies which must be kept within acceptable operating limits for their components and which must be adapted to dissipate the maximum possible losses without overheating.

2. Description of the Prior Art

The protection devices usually employed for this purpose operate on the converter circuit to limit its output power when the latter (or the power supplied by the source) reaches a predetermined threshold. These devices conventionally comprise means for calculating this power and means for comparing it with a threshold value. Further means are provided for transmitting to the converter a signal causing said limitation to be applied when the output power reaches said threshold.

If the converter has only one regulated voltage output the power is monitored by measuring the current supplied.

This basic principle can be applied only if the voltage regulation is sufficiently accurate.

It cannot be applied to a multiple output converter in which some outputs are not regulated and are subject to significant fluctuations.

The same applies if the total power to be controlled is less than the sum of the maximum powers that can be delivered by each output, which is the case with many commercially available power supplies.

In these various cases in which information relating to the output power cannot be obtained by simple measurement it is necessary to use a calculator circuit whose cost increases steeply with the required accuracy.

This is because to calculate a power $P = U \times I$ usually entails the use of a costly multiplier which determines a voltage x current product.

Inaccuracy in the calculation of this power results in a corresponding inaccuracy in the operation of the protection circuit which implies overrating the converter and therefore an increase in its cost, if the requirement is to remain within the limiting operating conditions previously referred to.

A particular object of the invention is to eliminate these drawbacks through a solution which makes it possible to reduce the cost of the protection circuit without compromising its accuracy and therefore without requiring the converter to be overrated.

SUMMARY OF THE INVENTION

To achieve this result it proposes a method of protecting a converter circuit supplied with a pulsed current by a primary source in which:

a voltage representing the mean value of the pulsed current supplied by the primary source is compared with a voltage proportional to a factor which can be the duty factor of said pulsed current or a function of said duty factor ; and the output power of the converter is limited according to the result of this comparison.

The invention exploits the fact that:

firstly in any regulated switch mode power converter device the control loop carries out an input voltage/duty factor conversion which is accessible in the switch control circuit, and secondly the voltage x duty factor product is easily obtained using a simple integrator circuit.

A device for implementing the method defined hereinabove may therefore advantageously comprise:

a filter circuit to which is applied a voltage representing the pulsed current flowing in the primary circuit of the converter, said filter circuit being designed to supply an output voltage representing the average value of said current;

a first integrator circuit whose input is adapted to be connected alternately by a first switch to the output of the filter circuit and to a reference potential, said first integrator circuit supplying at its output a voltage representing the product of said output voltage and a first duty factor;

a second integrator circuit whose input is adapted to be alternately connected to a reference voltage and to said reference potential, said second integrator supplying at its output a voltage representing the product of the reference voltage and a second duty factor; and a comparator having two inputs connected to respective outputs of the two switches, said comparator supplying a fault signal adapted to control limitation of the output power of the converter if the voltage supplied by the first switch reaches or exceeds the voltage supplied by the second switch.

Embodiments of protection devices implementing a method in accordance with the invention will be described hereinafter by way of non-limiting example with reference to the appended drawings.

DETAILED DESCRIPTION OF THE INVENTION

Figure 1:
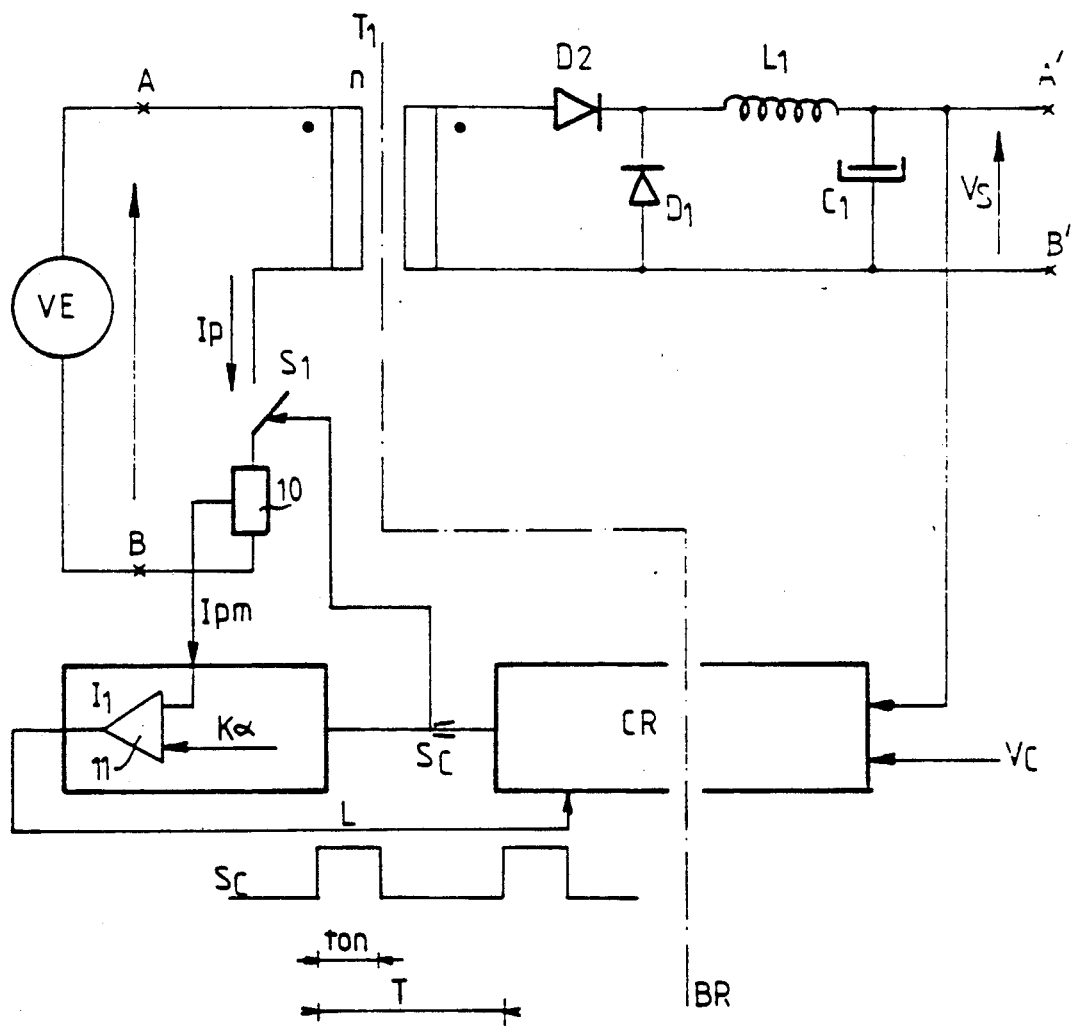
FIG. 1 is a block diagram showing the operating principle of a protection device in accordance with the invention applied to a forward type switch mode power supply (forward converters, half-bridge, bridge).

The switch mode power supply shown in FIG. 1 comprises a primary circuit supplied by a voltage source $V_E$ and comprising in series across the terminals AB of this source the primary of a transformer $T_1$, a switch $S_1$ and a cell 10 for detecting and filtering the current $I_P$ in the primary circuit.

One terminal of the secondary of the transformer $T_1$ is connected to an output terminal A' of the power supply through a circuit comprising a forward-biased diode $D_2$ in series with an inductor $L_1$. The other terminal of the transformer secondary is connected:

directly to the second terminal B, of the power supply;
 to the common point of the diode $D_2$ and the inductor $L_1$ by a second diode $D_1$ and to the output terminal A' by a capacitor $C_1$ which with the inductor $L_1$ forms a filter.

The winding directions of the windings of the transformer $T_1$ are such that energy is transferred to the secondary while the current $I_P$ is being established.

The switch $S_1$ is periodically closed for a time ton and opened for a time toff with a switching period T and under the control of a squarewave control signal $S_C$ produced by a regulator circuit CR.

The circuit CR varies the duty factor ton/T=$\alpha$ of the control signal according to the difference between the output voltage $V_S$ between the terminals A', B' and a set point value $V_C$. The circuit CR is advantageously designed to provide galvanic isolation between the transformer primary and secondary (by means of an insulating barrier BR passing through the transformer T1 as shown by the chain-dotted line).

Let IPm denote the mean value of the primary current and n the transformer ratio. The output voltage $V_S$ is given by the equation:

$$V_S = \alpha \times V_E \times n$$

and the power Pa drawn from the source is given by the equation:

$$Pa = V_E \times IPm = V_S \times IPm/\alpha n$$

The condition "Wanted power"≦"Set point power" that the invention seeks to impose to protect the power supply circuit can then be written:

$$Pa = V_S \times IPm/\alpha n \leq \text{"Set point power"}$$

In theory the set point power is equal to the maximum wanted output power.

The above condition can be reduced to the condition:

$$IPm \leq K \times \alpha$$

in which K is a constant depending on the efficiency $\eta$ given by the equation:

$$K = \text{"Set point power"} \times n / V_S \times \eta$$

To impose the condition "Wanted power"≦"Set point power" the invention proposes that a voltage representing Im should be compared with a voltage proportional to $\alpha$.

In the FIG. 1 example, the value IPm (mean current supplied by the source) is measured by a detector and filter circuit 10 in series with the switch $S_1$ and the voltage $K\alpha$ proportional to the duty factor $\alpha$ is derived from the switching control signal $S_C$ supplied by the regulator circuit CR.

This protection circuit in accordance with the invention therefore comprises a comparator 11 which receives on respective inputs the signal IPm and the signal $K \times \alpha$.

If the value IPm reaches the value $K\alpha$, the comparator sends to the regulator circuit CR a limiting signal L whose effect is to limit the output power of the power supply.

Figure 2:
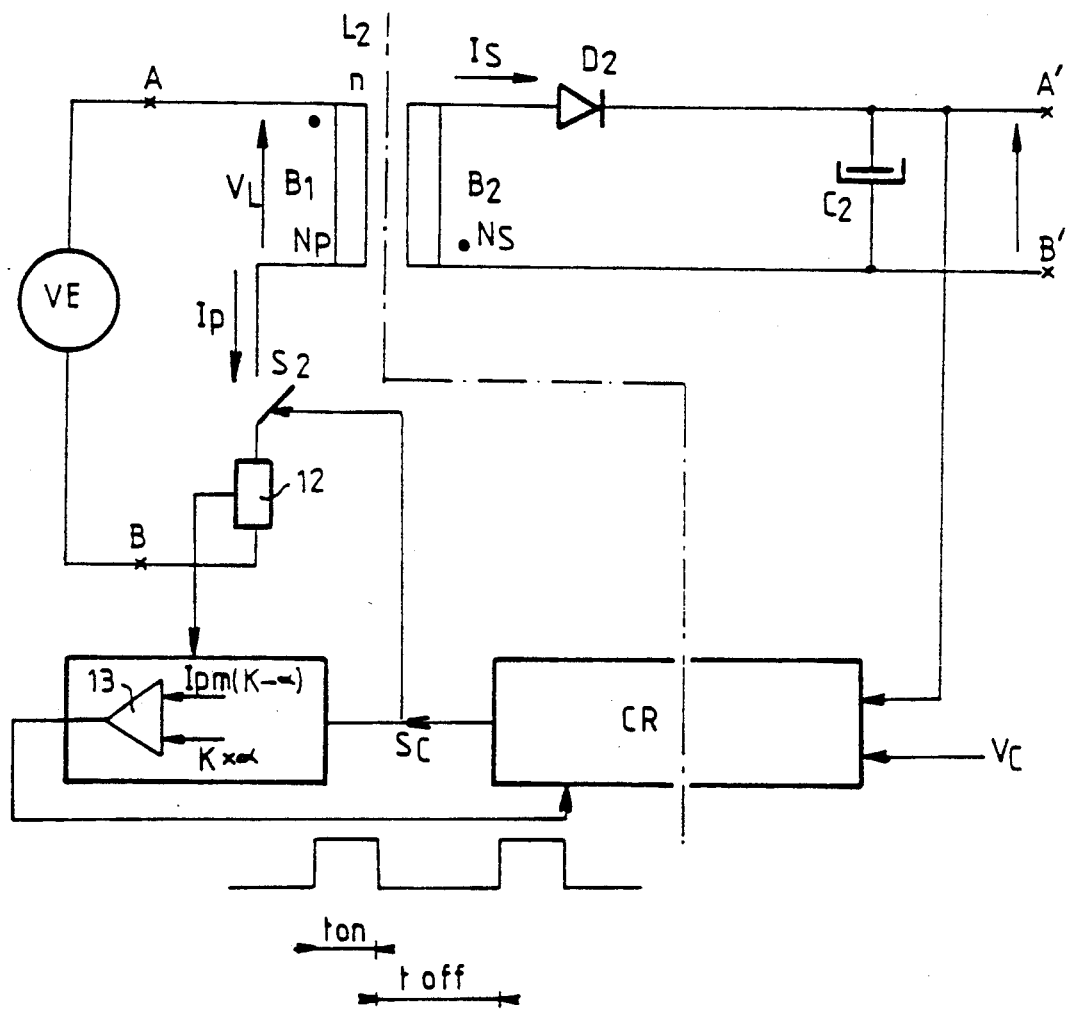
FIG. 2 is a block diagram showing the operating principle of a protection device fitted to a flyback type switch mode power supply.

FIG. 2 shows a flyback type power supply in which the four-pole network comprises a primary circuit connected between the terminals A and B of the direct current source $V_E$. This circuit comprises in series with the primary winding $B_1$ an inductor $L_2$, a switch $S_2$ and a detector and filter circuit 12 adapted to determine the mean current IPm passing through it.

The secondary circuit of this power supply comprises in series between the output terminals A', B' a secondary winding $B_2$ of the inductor $L_2$ and a forward-biased diode $D_2$. A filter capacitor $C_2$ is also connected between the two terminals A', B'.

In a circuit of this kind the energy transmitted when the switch $S_2$ is closed is initially (magnetization phase) stored in the inductor $L_2$ and is then (demagnetization phase) transferred to the load.

As in the previous example the switch $S_2$ is controlled by a regulator circuit CR designed to maintain the output voltage $V_S$ at a set point value.

The power supply shown in this figure has two modes of operation:

a first mode of operation in which the inductor $L_2$ is never demagnetized, and
 a second mode of operation in which the inductor $L_2$ remains demagnetized for a non-null time period.

Figure 3:
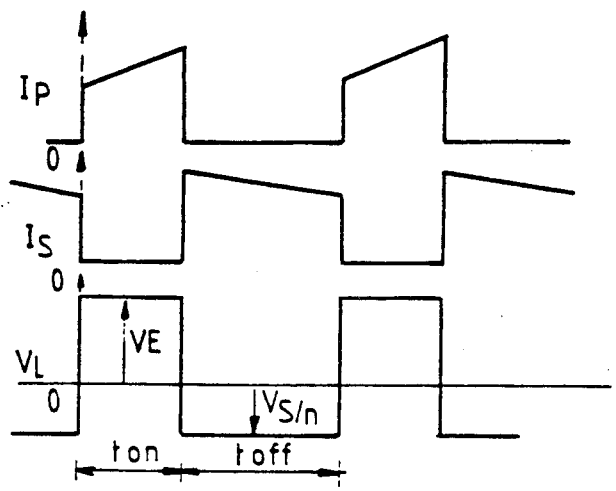
FIGS. 3 and are diagrams showing the variation as a function of time of the currents $I_P$ and $I_S$ and the voltage VL of the circuit shown in FIG. 2 in the case of an inductor that is never demagnetized (FIG. 3) and in the case of an inductor that is periodically demagnetized (FIG. 4).

FIG. 3 shows the variation with time of the primary current $I_P$, the secondary current $I_S$ and the voltage $V_L$ of the circuit shown in FIG. 2.

The currents $I_P$ and $I_S$ are trapezium-shape pulsed currents. The current $I_S$ has a null value during the time ton for which the switch $S_2$ is closed. The current $I_P$ has a null value during the time toff for which the switch $S_2$ is open. The voltage $V_L$ across the primary winding $B_1$ never has a null value. While the switch is closed it has a value U and while the switch is open (demagnetization phase) it has a value $-V_S/n$ (where n is the transformer ratio: $n = N_S/N_P$ number of secondary turns/number of primary turns).

Because energy is conserved, the mean voltage across the primary winding $B_1$ has a null value, which is expressed by the equation:

$$V_E \times ton - V_S \times toff/n = 0$$

The voltage $V_E$ is then given by the equation:

$$V_E = V_S \frac{1}{n} \times \frac{toff}{ton} = V_S \times \frac{1-\alpha}{\alpha \times n}$$

where $\alpha = ton/T$ and $(1-\alpha) = toff/T$.

If $\eta$ denotes the efficiency of the power supply, the wanted power Pu can then be written:

$$Pu = \eta \times IPm \times V_E = IPm \times VS \times \frac{\eta}{n} \times \frac{1-\alpha}{\alpha}$$

The condition for the wanted power not to exceed a set point value may then be written in this equivalent form:

$$IPm \times (1-\alpha) \leq K\alpha$$

in which K is a constant given by the equation:

$$K = \text{"Set point power"} \times \frac{n}{\eta V_S}$$

This condition can be achieved easily by comparing a voltage proportional to the current IPm and to the duty factor $(1-\alpha)$ with a voltage proportional to the duty factor $\alpha$.

This protection circuit in accordance with the invention uses a comparator 13 which receives on respective inputs a voltage representing the product IPm $(1-\alpha)$ and a voltage representing the product K $\alpha$, the values $(1-\alpha)$ and $\alpha$ being derived from the switching control signal for the switch $S_2$.

In a similar manner to that described, the comparator 13 operates on the regulator circuit CR to limit the output power of the power supply if the product IPm $(1-\alpha)$ becomes equal to or exceeds the product K $\alpha$.

Figure 4:
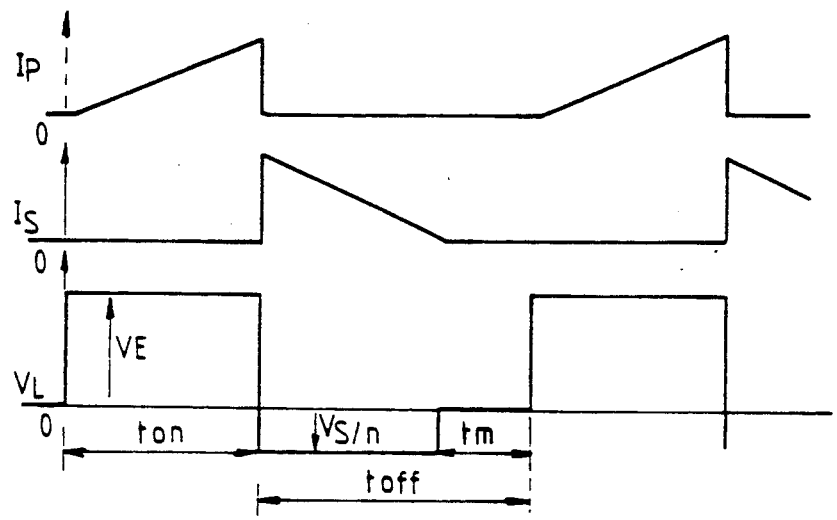

When the power supply shown in FIG. 2 operates in the second mode (inductor demagnetized) the currents $I_P$ and $I_S$ are triangular pulsed currents substantially in phase opposition (FIG. 4). The voltage $V_L$ assumes the value $V_E$ during the time ton. During the time toff it first assumes a value $-V_S/n$ and is then cancelled out for a time tm included within toff.

In this case all the equations established for the first mode of operation remain valid if the time toff is replaced by (toff−tm) and the duty factor $(1-\alpha)$ is replaced by $(1-\alpha-tm/T)=(1-\beta)$ where $\beta=\alpha+tm/T$.

The condition to be complied with if the wanted power is to remain below a set point value is then:

$$IPm \times (1-\beta) \leq K\alpha$$

In the circuit shown in FIG. 2 it suffices to apply to the respective inputs of the comparator 13 voltages representing IPm $(1-\beta)$ and K $\alpha$.

The voltage representing K $\alpha$ is derived from the control signal of the switch $S_2$.

A magnitude representing the time interval (toff−tm) can be derived because if demagnetization of the inductor is not complete a voltage is present across the windings of the inductor.

Figure 6:
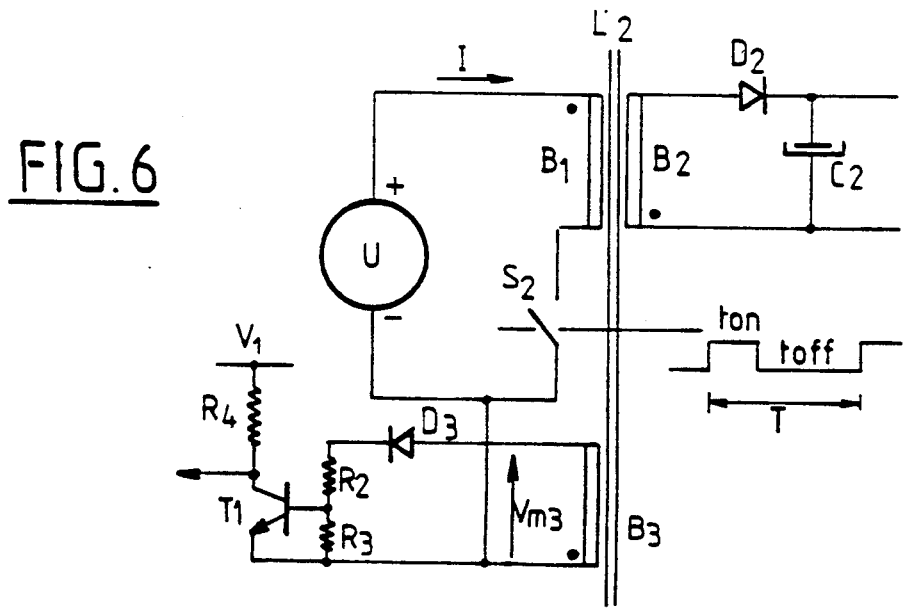
FIG. 6 shows a flyback type switch mode power supply with an inductor that is periodically demagnetized fitted with a circuit for obtaining a squarewave signal of period T in which the pulse duration is equal to (toff − tm).

With a device of the type shown in FIG. 6 it is possible to obtain a squarewave signal in which each pulse has a width representing the time interval (toff−tm).

The device as shown comprises a secondary winding $B_3$ of the inductor $L_2$ across which are connected a diode $D_3$ in series with a voltage divider $R_2-R_3$ which biases the base of an NPN transistor $T_1$. The collector of the transistor $T_1$ is connected to a DC voltage source $V_1$ through a resistor $R_4$. Its emitter is grounded.

During each demagnetization phase of the inductor $L_2$ (toff−tm) the transistor $T_1$ biased by the current flowing in the forward direction of the diode $D_3$ will be turned on and will have a substantially null emitter/collector voltage. During the magnetization phases ton and during the period tm in which the voltage across the inductor $L_2$ is cancelled out the base of the transistor $T_1$ is grounded (no current flows in the bridge) and its emitter/collector voltage is substantially equal to the supply voltage.

The result is a squarewave signal at the collector of the transistor $T_1$ in which the duration of the gap between pulses is equal to (toff−tm).

Figure 7:
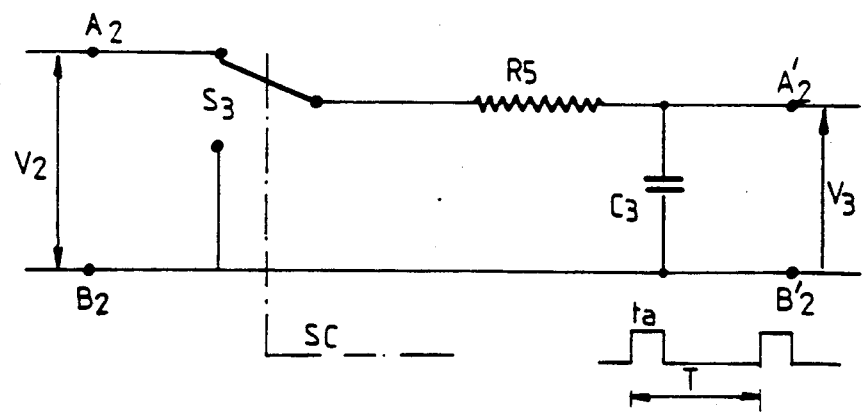
FIG. 7 is the circuit diagram of a simple electronic circuit for obtaining the product of a voltage and a time.

The product of a voltage and a duty factor such as the product Im $\times(1-\alpha)$, the product K $\times\alpha$ or even the product IPm $(1-\beta)$ can be obtained using a simple electronic circuit like that shown in FIG. 7. This is a four-pole network having two inputs $A_2$, $B_2$ connected to respective fixed contacts of a switch $S_3$ and two output terminals $A'_2$, $B'_2$ one of which is connected directly to the input terminal and the other of which is connected to the moving contact of the switch $S_3$ through a resistor $R_5$. The resistor $R_5$ is part of a filter $R_5$-$C_3$ the capacitor $C_3$ in which is connected between the terminals $A'_2$, $B'_2$.

The voltage $V_2$ to be multiplied by a duty factor ta/T is applied between the input terminals $A_2$, $B_2$ and the switch $S_3$ is controlled by a squarewave signal of duration T in which each pulse is of duration ta. During each pulse the switch $S_3$ switches the voltage $V_2$ to be multiplied to the filter $R_5$-$C_3$ and during the gaps between the pulses the switch $S_3$ applies a null voltage to the filter $R_5$-$C_3$. The voltage $V_3$ between the terminals $A'_2$, $B'_2$ of the circuit is then given by the equation:

$$\begin{aligned} V_3 &= V_2 \times ta/T + 0 \times to/T \quad \text{where } T = ta + to \\ &= V_2 \times \alpha \quad \text{where } \alpha \text{ is the duty factor } ta/T \text{ of the squarewave signal} \\ &= \frac{V_2}{T} \times ta \end{aligned}$$

A circuit of this kind provides a very simple and very low cost means of obtaining the product of a voltage $V_2$ by a duty factor $\alpha$ of a squarewave signal.

Figure 5:
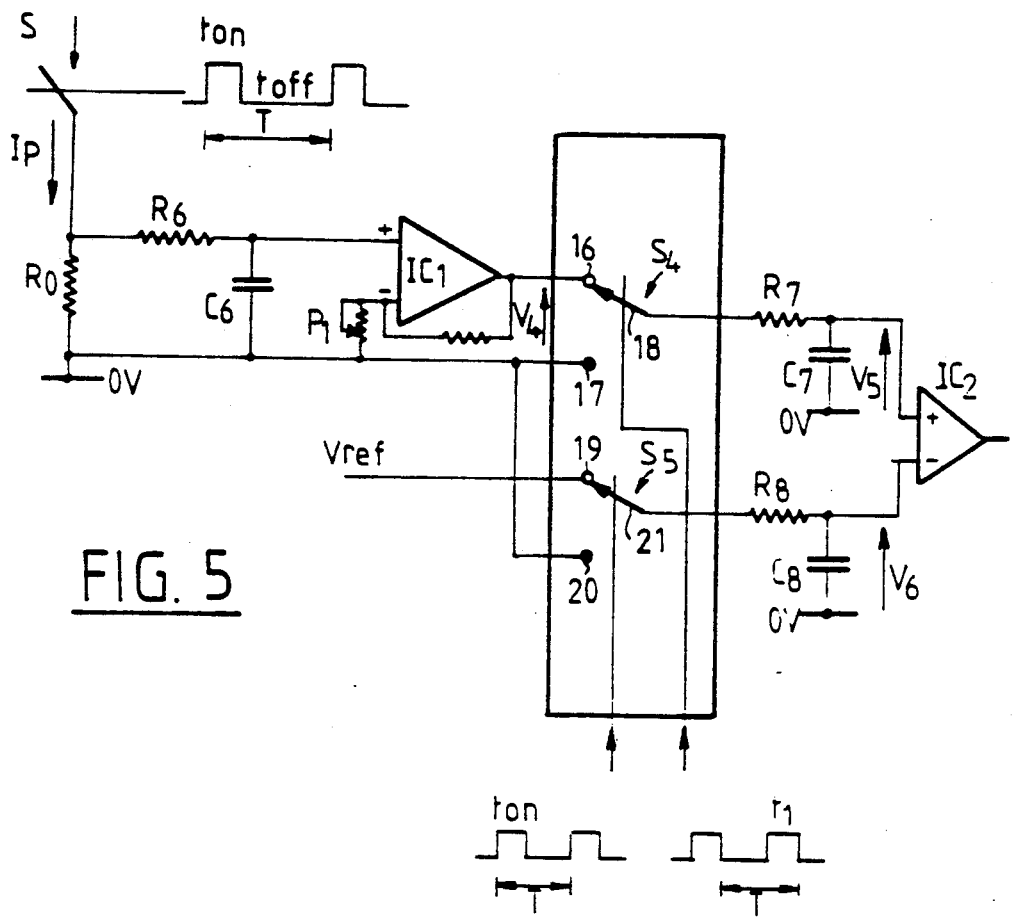
FIG. 5 is a block diagram of one embodiment of a limiting power detector circuit usable with a switch mode power supply of the types shown in FIGS. 1 and 2.

This circuit is used in the limiting power detector device shown in FIG. 5 which can be used in a protection circuit like those shown in FIGS. 1 and 2.

In this example only the switch S of the switch mode supply in series with a current sensing resistor $R_0$ is shown, it being understood that the power supply can be of the forward type as shown in FIG. 1 or of the flyback type with an inductor that is never demagnetized or sometimes demagnetized as shown in FIG. 2.

The voltage across the resistor $R_0$ is applied to a filter comprising a resistor $R_6$ and a capacitor $C_6$ whose values are determined to produce across the capacitor $C_6$ a voltage representing the mean value IPm of the current IP in the primary of the switch mode power supply.

The capacitor $C_6$ is connected to the two inputs of an operational amplifier $IC_1$ whose gain is varied by a potentiometer $P_1$ and which supplies a variable DC output voltage $V_4$.

The voltage $V_4$ is applied to one of the two inputs 16 of the switch $S_4$ whose other input 17 is grounded (at 0 V). The output 18 of the switch $S_4$ is connected to a filter comprising a resistor $R_7$ in series with a grounded capacitor $C_7$. The combination of the switch $S_4$ and the filter $R_7$-$C_7$ constitutes a device for multiplying the voltage $V_4$ representing the current IPm by a first factor which can be the duty factor $(1-\alpha)$ of the control signal of the switch S or the duty factor $(1-\beta)$ previously referred to.

The voltage $V_5$ across the capacitor $C_7$ (which represents said product) is applied to the non-inverting input of an operational amplifier $IC_2$ used as a comparator.

The inverting input of the amplifier $IC_2$ receives the output voltage $V_6$ of a circuit of the type shown in FIG. 7 which produces the product of a reference voltage $V_{ref}$ and a second duty factor of the same type as the first.

This circuit includes a switch $S_5$ having one input 19 connected to a voltage source $V_{ref}$ and another input 20 grounded (at 0 V). The output 21 is connected to a filter comprising a resistor $R_8$ is series with a grounded capacitor $C_8$. The voltage $V_6$ at the common point of the resistor $R_8$ and the capacitor $C_8$ is applied to the negative input of the operational amplifier $IC_2$.

If the power supply effects forwards conversion (as in the circuit shown in FIG. 1) the output 18 of the switch $S_4$ is connected at all times to the input 16 and the switch $S_5$ is controlled by the control signal $S_C$ of the switch S so as to apply the voltage $V_{ref}$ to the filter $R_8$-$C_8$ during the times ton of the control signal $S_C$.

In this case, the amplifier $IC_2$ compares the voltage $V_4$ representing the mean current IPm and the voltage $V_6$ representing (ignoring the scaling factor due to the gain) the duty factor $\alpha$ of the control signal $S_C$ of the switch S.

The amplifier $IC_2$ is designed to supply a fault signal if the voltage $V_5$ becomes equal to or exceeds the voltage $V_6$.

If the power supply is of the flyback type with partial demagnetization the switch $S_4$ is controlled by the control signal $S_C$ in such a way as to apply the voltage $V_4$ to the filter $R_7$-$C_7$ during the times toff of the control signal $S_C$. The switch $S_5$ is controlled by the same signal $S_C$ but in such a way as to apply the voltage $V_{ref}$ to the filter $R_8$-$C_8$ during the times ton of the control signal $S_C$.

In this case the comparator $IC_2$ compares the voltage $V_4$ representing the product $IPm \times (1-\alpha)$ with the voltage $V_6$ representing the voltage $V_{ref}$ multiplied by the duty factor $\alpha$ (realizing the condition $IPm \times (1-\alpha) \leq K\alpha$).

If the power supply is of the flyback type with the inductor periodically demagnetized, the switch $S_4$ is controlled by a signal of the kind produced by the circuit shown in FIG. 6 so as to apply the voltage $V_4$ to the filter $R_7$-$C_7$ during the time intervals (toff - tm) of the pulsed current flowing in the inductor $L_2$. The switch $S_5$ is controlled by the control signal $S_C$ of the switch I so as to apply the voltage $V_{ref}$ to the filter $R_8$-$C_8$ during the times ton.

The comparator $IC_2$ then verifies the condition:

$$IPm \times (1-\beta) \leq K\alpha$$

where $\beta = (ton - tm)/T$ and transmits a fault signal if this condition is not complied with.

I claim:

1. Method for protecting against overload an electrical converter circuit supplied with a pulsed current having a duty factor, comprising the steps of:
   calculating a mean value of said pulsed current;
   producing a first voltage having a value proportional to said mean value;
   producing a second voltage having a value proportional to a maximum wanted output power of the converter and to said duty factor;
   comparing the values of said first and second voltages; and
   limiting an output power of the converter if the first voltage becomes greater than the second.

2. Method according to claim 1 wherein the duty factor of the pulsed current is varied to maintain the converter output voltage constant.

3. Method for protecting against overload an electrical converter circuit of the forward conversion type having an output voltage and supplied with a pulsed current having a duty factor and comprising a transformer having a transformer ratio, said method comprising the steps of:
   calculating a mean value of said pulsed current;
   producing a first voltage having a value proportional to said mean value;
   producing a second voltage having a value representative of a maximum wanted output power multiplied by the duty factor and by said transformer ratio and divided by a value of a converter output voltage and by a converter efficiency;
   comparing the values of said first and second voltages; and
   limiting of an output power of the converter if the first voltage becomes greater than the second.

4. Method for protecting against overload an electrical converter circuit of the flyback type comprising a transformer having a transformer ratio and an inductor that is never demagnetized, said converter having an output voltage and being supplied by a primary source with a pulsed current having a duty factor, said method comprising the step of:
   calculating a mean value of said pulsed current;
   producing a first voltage having a value proportional to said mean value multiplied by a duty factor of interruptions of said current;
   producing a second voltage representative of a value of a maximum wanted output power multiplied by the transformer ratio and by the duty factor and divided by a value of the converter output voltage and by a converter efficiency;
   comparing the values of said first and second voltages; and
   limiting the output power of the converter if the first voltage becomes greater than the second.

5. Method for protecting against overload an electrical converter circuit of the flyback type comprising a transformer having a transformer ratio and a periodically demagnetized inductor, said converter being supplied with a pulsed current having a duty factor, said method comprising the step of:
   calculating a mean value of said pulsed current;
   producing a first voltage having a value representative of:

$$IPm \times (toff - tm)/T$$

in which IPm is said mean value, toff represents a value of a time interval between the pulses of the pulsed current, tm represents a value of a time period during which a voltage across the inductor is cancelled out and T represents a value of a period of the pulsed current;
   producing a second voltage representative of a maximum wanted output power multiplied by the transformer ratio and by the duty factor and divided by a value of a converter output voltage and by a converter efficiency;

comparing the values of said first and second voltages; and limiting the output power of the converter if the first voltage becomes greater than the second.

6. Method according to claim 1 wherein the multiplication of a value of a voltage by a duty factor is provided by alternately routing said voltage and a reference potential to an RC filter at the timing rate of the pulsed current pulses during time lapses corresponding to said duty factor.

7. Device for protecting against overloads an electrical converter circuit supplied with a pulsed current by a primary source, said device comprising:
   a first filter to which is applied a voltage representing the pulsed current applied to the converter, said filter being designed to supply an output voltage representing the average value of said current;
   a first integrator whose input is adapted to be connected alternately by a first switch to the output of the first filter and to a reference potential, said first integrator supplying at its output a voltage representing the product of said output voltage and a duty factor;
   a second integrator whose input is adapted to be alternately connected by a second switch to a reference voltage source and to a reference potential, said second integrator supplying at its output a voltage representing the product of the reference voltage and a second duty factor; an
   a comparator having two inputs connected to respective outputs of the two integrators, said comparator supplying a fault signal adapted to control limitation of the output power of the converter if the voltage supplied by the first integrator reaches or exceeds the voltage supplied by the second integrator.

8. Device according to claim 7 for use in a forward type converter wherein said first switch is controlled so as to apply continuously to the input of the first integrator the voltage representing the mean pulsed current and the second switch is controlled in such a way as to transmit the reference voltage to the second integrator during time periods representing pulses of the pulsed current and a null voltage during time periods representing gaps between the pulses of said pulsed current.

9. Device according to claim 7 for use in a flyback partial demagnetization type converter wherein the first switch is controlled in such a way as to apply to the input of the first integrator the voltage representing the mean pulsed primary current during time periods representing gaps between the pulses of the pulsed current and a null voltage during time periods representing said pulses and the second switch is controlled in such a way as to apply the reference voltage to the input of the second integrator during the time periods representing said pulses and a null voltage during the time periods representing the gaps between said pulses.

10. Device according to claim 7 for use in a flyback full demagnetization type converter wherein the first switch is controlled in such a way as to apply to the input of the first integrator the voltage representing the mean pulsed primary current during time intervals of the period of the pulsed current equal to the interval between the pulses of the pulsed current less the time period during which the voltage across the converter inductor is cancelled out and the second switch is controlled in such a way as to apply the reference voltage to the second integrator during time periods representing said pulses and a null voltage during time periods representing the gaps between said pulses.

11. Device according to claim 7 wherein said first filter comprises a circuit comprising a resistor in series with a grounded capacitor and the voltage at the common point of said resistor and said capacitor is applied to the input of a variable gain operational amplifier.

12. Device according to claim 7 wherein said first switch is controlled by a signal at the collector of a transistor whose base is biased by a voltage divider bridge connected in series in a circuit comprising a secondary winding of the inductor and a diode.

13. Method for protecting against overload an electrical converter circuit supplied with a pulsed current having a duty factor, comprising the steps of:
   calculating a mean value of said pulsed current;
   producing a first voltage having a value proportional to said mean value;
   producing a second voltage having a value proportional to a maximum wanted output power of the converter and to a function of said duty factor;
   comparing the values of said first and second voltages; and
   limiting an output power of the converter if the first voltage becomes greater than the second.

* * * * *